US009484053B2

(12) United States Patent
Suzuki et al.

(10) Patent No.: US 9,484,053 B2
(45) Date of Patent: *Nov. 1, 2016

(54) OPTICAL INFORMATION RECORDING MEDIUM AND OPTICAL INFORMATION RECORDING MEDIUM REPRODUCING DEVICE

(71) Applicant: Sony Corporation, Tokyo (JP)

(72) Inventors: Yuuichi Suzuki, Kanagawa (JP); Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/402,742

(22) PCT Filed: Mar. 15, 2013

(86) PCT No.: PCT/JP2013/058456
§ 371 (c)(1),
(2) Date: Nov. 21, 2014

(87) PCT Pub. No.: WO2013/179745
PCT Pub. Date: Dec. 5, 2013

(65) Prior Publication Data
US 2015/0103640 A1     Apr. 16, 2015

(30) Foreign Application Priority Data
May 30, 2012   (JP) ................................ 2012-123216

(51) Int. Cl.
*G11B 7/007*     (2006.01)
*G11B 7/24082*   (2013.01)
(Continued)

(52) U.S. Cl.
CPC ......... *G11B 7/0079* (2013.01); *G11B 7/24082* (2013.01); *G11B 27/24* (2013.01);
(Continued)

(58) Field of Classification Search
CPC ............ G11B 2007/00754; G11B 2220/2541; G11B 27/24; G11B 7/00718; G11B 7/0079; G11B 7/24082; G11B 2020/1268; G11B 2020/1278; G11B 20/10009; G11B 2020/1232; G11B 2020/1265; G11B 2020/1279; G11B 2020/1287
See application file for complete search history.

(56) References Cited

U.S. PATENT DOCUMENTS 7,075,883 B2 * 7/2006 Minamino et al. ........ 369/275.3
2002/0172139 A1 * 11/2002 Kondo et al. .............. 369/275.4
(Continued)

FOREIGN PATENT DOCUMENTS

| JP | 09-219024 A | 8/1997 |
|----|-------------|--------|
| JP | 2003-178464 A | 6/2003 |
| JP | 2003-323725 A | 11/2003 |
| JP | 2004-265546 A | 9/2004 |
| JP | 2006-228293 A | 8/2006 |

OTHER PUBLICATIONS

Shinsho, Next-generation optical disc. Nikkei Business Publications, Inc. Oct. 7, 2003:64-69.

*Primary Examiner* — Dionne H Pendleton
(74) *Attorney, Agent, or Firm* — Chip Law Group

(57) ABSTRACT

Provided is a CAV or a zone CAV. A groove which continuously wobbles is preliminary formed and information is recorded in the groove and a land adjacent to the groove, the groove has a first wobble part which is modulated by groove address information, a second wobble part which is modulated by address information of one adjacent land, and a third wobble part which is modulated by address information of the other adjacent land, a first section sandwiched between the second wobble parts of adjacent two grooves and a second section sandwiched between the third wobble parts of the adjacent two grooves are formed on the land, and one of phases of wobbles on both sides of the first section and phases of wobbles on both sides of the second section are substantially in-phase.

7 Claims, 13 Drawing Sheets

(51) Int. Cl.
    *G11B 27/24*      (2006.01)
    *G11B 20/12*      (2006.01)

(52) U.S. Cl.
    CPC .. *G11B7/00718* (2013.01); *G11B 2007/00754* (2013.01); *G11B 2020/1265* (2013.01); *G11B 2020/1268* (2013.01); *G11B 2020/1278* (2013.01); *G11B 2020/1287* (2013.01); *G11B 2220/2541* (2013.01)

(56) References Cited

U.S. PATENT DOCUMENTS

| | | |
|---|---|---|
| 2004/0174792 A1 | 9/2004 | Miyamoto et al. |
| 2014/0086037 A1* | 3/2014 | Kobayashi ......... G11B 7/24082 369/275.4 |
| 2015/0179207 A1* | 6/2015 | Minamino ......... G11B 20/1217 369/30.1 |

\* cited by examiner

FIG. 3

| ADIP UNIT NUMBER | ADIP UNIT TYPE | ADIP NIBBLE BIT NUMBER | ADIP CODE WORD NIBBLE NUMBER |
|---|---|---|---|
| 0 | MONOTONE | - - - | - - - |
| 1 | sync_0 | - - - | |
| 2 | MONOTONE | - - - | |
| 3 | sync_1 | - - - | |
| 4 | MONOTONE | - - - | |
| 5 | sync_2 | - - - | |
| 6 | MONOTONE | - - - | |
| 7 | sync_3 | - - - | |
| 8 | REFERENCE | - - - | |
| 9 | data_x | b3 | C0 |
| 10 | data_x | b2 | |
| 11 | data_x | b1 | |
| 12 | data_x | b0 | |
| 13 | REFERENCE | | - - - |
| 14 | data_x | b3 | C1 |
| 15 | data_x | b2 | |
| 16 | data_x | b1 | |
| 17 | data_x | b0 | |
| 18 | REFERENCE | | |
| 78 | REFERENCE | | - - - |
| 79 | data_x | b3 | C14 |
| 80 | data_x | b2 | |
| 81 | data_x | b1 | |
| 82 | data_x | b0 | |

FIG. 5
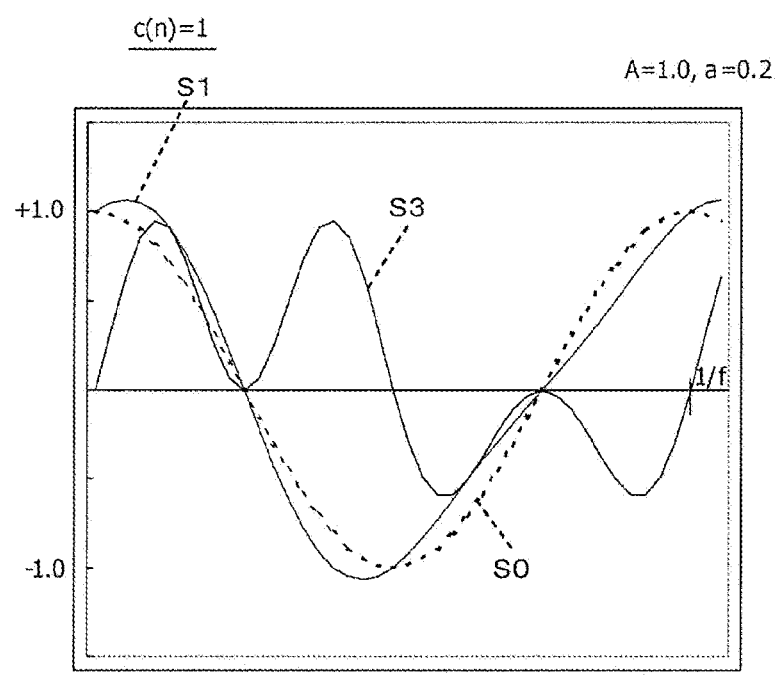
A
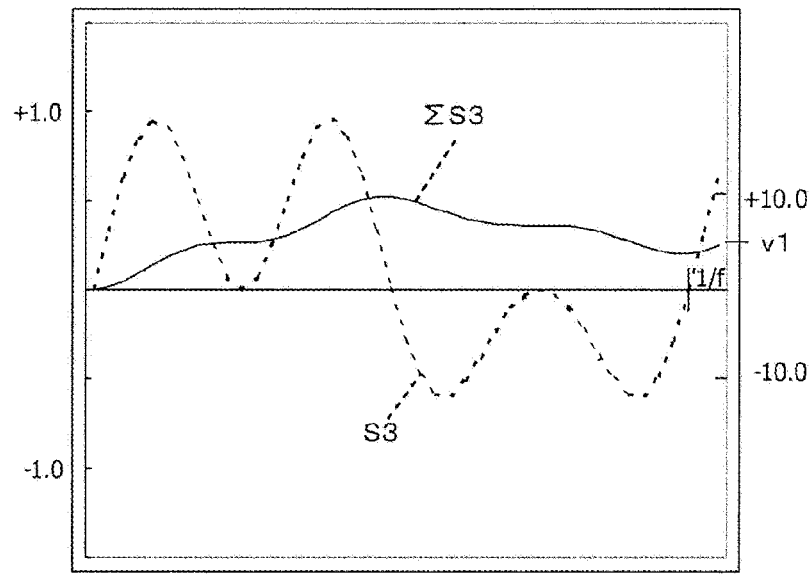
B

FIG. 6
A
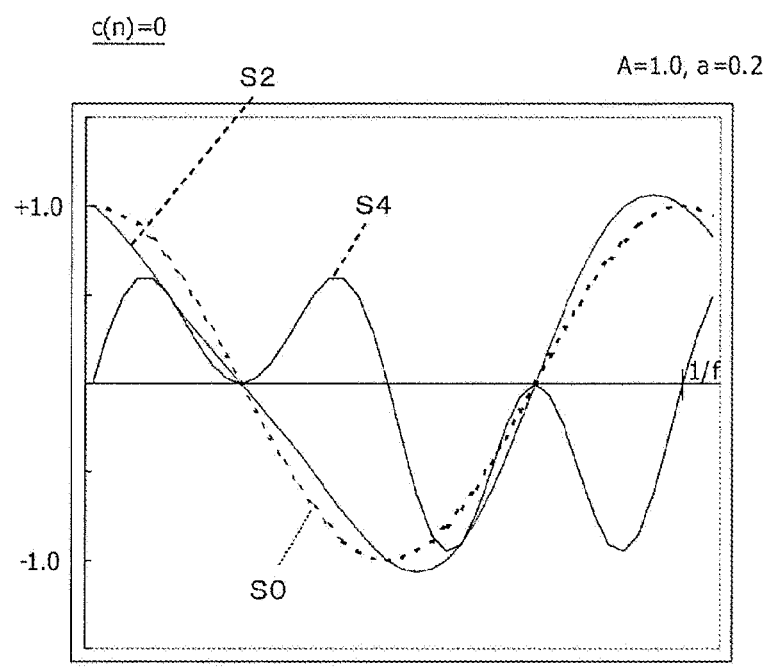
B
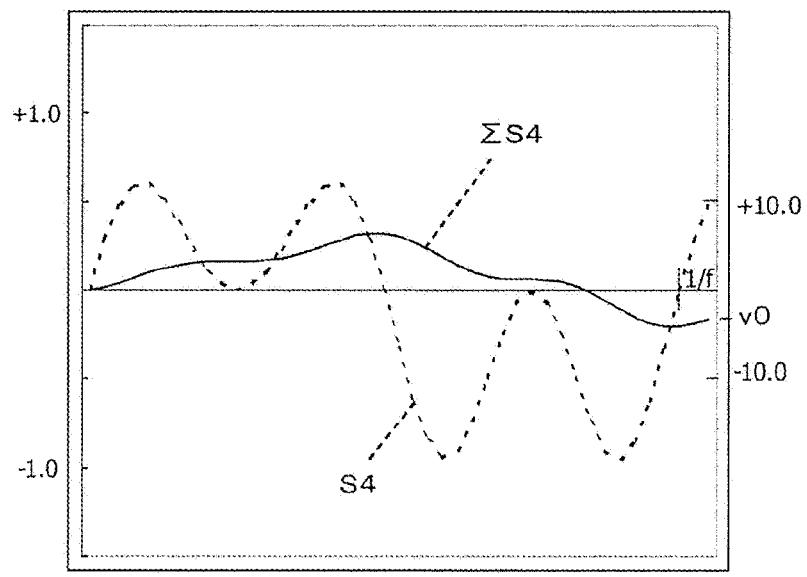

FIG. 9

| | GROOVE ADDRESS | LAND ADDRESS (EVEN NUMBER TRACK) | LAND ADDRESS (ODD NUMBER TRACK) |
|---|---|---|---|
| Trk n (GROOVE) | Groove (n) Ref ◨ Data ◨ | | |
| Trk n+1 (LAND) | | Land (n+1) Ref ◨ Data ◨ | Land (n−1) Ref ◨ Data ◨ |
| Trk n+2 (GROOVE) | Groove (n+2) Ref ◨ Data ◨ | | |
| Trk n+3 (LAND) | | Land (n+1) Ref ◨ Data ◨ | Land (n+3) Ref ◨ Data ◨ |
| Trk n+4 (GROOVE) | Groove (n+4) Ref ◨ Data ◨ | | |
| Trk n+5 (LAND) | | Land (n+5) Ref ◨ Data ◨ | Land (n+3) Ref ◨ Data ◨ |
| Trk n+6 (GROOVE) | Groove (n+6) Ref ◨ Data ◨ | | |
| Trk n+7 (LAND) | | Land (n+5) Ref ◨ Data ◨ | Land (n+7) Ref ◨ Data ◨ |
| Trk n+8 (GROOVE) | Groove (n+8) Ref ◨ Data ◨ | | |
| Trk n+9 (LAND) | | Land (n+9) Ref ◨ Data ◨ | Land (n+7) Ref ◨ Data ◨ |

☐ Monotone Wobble
◨ Sawtooth wobble representing a "1"
◪ Sawtooth wobble representing a "0"

OPTICAL INFORMATION RECORDING MEDIUM AND OPTICAL INFORMATION RECORDING MEDIUM REPRODUCING DEVICE

TECHNICAL FIELD

The present disclosure relates to an optical information recording medium and an optical information recording medium reproducing device applied to, for example, a recordable optical disk.

BACKGROUND ART

Conventionally, an optical disk which records information or reproduces recorded information using laser light has been practically used. As types of the optical disk, there are a reproduction-only type, a write-once type, and a rewritable type. In the write-once type and the rewritable type, it is necessary that the address information indicating the position of the optical disk be preliminarily recorded for the recording of the information.

As methods to record the address information, two types have been known. One is a format which records the address information as a preformat pit. The other is a format in which a signal that forms a trench referred to as a wobble for the trench is modulated by the address information. In recording the preformat pit, there is a problem that a recording area of user data and a recording capacity of the optical disk decrease. In a wobble format, there is an advantage of not having such a problem. A trench is referred to as a groove, and a track formed by the groove is referred to as a groove track. The groove is defined as a part which is irradiated with laser light when the optical disk is manufactured. An area sandwiched between the adjacent grooves is referred to as a land, and the track formed by the land is referred to as a land track.

When an address is recorded by the wobble, a method (suitably referred to as a land/groove recording format) in which the data is recorded in both the groove track and the land track is desirable, in order to further increase the recording capacity. In the land/groove recording format, the address information for the groove track can be recorded by deflecting the laser light when cutting. However, it is difficult to record the address for the land track by the wobble. When the land track is scanned, the wobbles of the groove track on both sides are reproduced. Furthermore, these wobbles are information of different groove tracks. Therefore, the phases of the wobbles are not aligned, and it is difficult to reproduce the wobbles normally.

Conventionally, in the land/groove recording format, the optical disk, capable of reproducing addresses of both the groove track and the land track, has been proposed. Patent Document 1 describes the disclosure in which the address is intermittently recorded and the phase of the recording position of the address is reversed for the adjacent groove track, when the address is recorded in the groove track by the wobble. As a result of this, the address information originally recorded is intermittently reproduced when a wobble track is reproduced. Then, the addresses of the adjacent groove tracks on both sides are reproduced alternately when the land track is reproduced. Therefore, wobble information (address information) can be obtained in either of groove scanning and land scanning.

Patent Documents 2 and 3 describe the disclosures in which the land track and the groove track are each wobbled, and the address information is recorded by the wobble on a side wall on one side in each track. In addition, an address information block of the wobble track and the address information block of the groove track are arranged by being shifted in a track direction.

CITATION LIST

Patent Documents

Patent Document 1: Japanese Patent Application Laid-Open No. 09-219024
Patent Document 2: Japanese Patent Application Laid-Open No. 2003-178464
Patent Document 3: Japanese Patent Application Laid-Open No. 2006-228293

SUMMARY OF THE INVENTION

Problems to be Solved by the Invention

In the above-described disclosure described in Patent Document 1, as the address of the land track, the address of one of the adjacent two groove tracks is reproduced. Therefore, it is highly likely that the groove address may become unreadable due to off-track. In addition, in the disclosure described in Patent Document 1, there are intermittently wobbles in the groove track. The wobble is a signal to be a basis for generating a clock corresponding to the position on the optical disk. The clock is a signal necessary for both recording and reproducing. Therefore, as Patent Document 1, the fact that there are intermittently sections without the wobble in the groove track, is disadvantageous in generating the clock with high precision.

In the disclosures described in Patent Document 2 and 3, the wobble is not interrupted. Therefore, there is no problem in generating the clock. However, it is necessary to wobble a trench wall on the one side in order to record auxiliary information in addition to the wobble of the basic frequency. The formation of the wobble in this manner is difficult by the single laser light when cutting, and there is a problem that a cutting device becomes complex.

Therefore, the present disclosure is intended to provide an optical information recording medium capable of being cut by the single laser light without the wobbles being interrupted in the groove track, and an optical information recording medium reproducing device.

Solutions to Problems

To solve the above-described problem, the present disclosure provides an optical information recording medium of a CAV or a zone CAV, wherein a groove which continuously wobbles is preliminary formed and information is recorded in the groove and a land adjacent to the groove, the groove has a first wobble part which is modulated by groove address information, a second wobble part which is modulated by address information of one adjacent land, and a third wobble part which is modulated by address information of the other adjacent land, a first section sandwiched between the second wobble parts of adjacent two grooves and a second section sandwiched between the third wobble parts of the adjacent two grooves are formed on the land, and one of phases of wobbles on both sides of the first section and phases of wobbles on both sides of the second section are substantially in-phase.

The present disclosure provides an optical information recording medium reproducing device configured to optically reproduce an optical information recording medium of a CAV or a zone CAV, wherein a groove which continuously wobbles is preliminary formed and information is recorded in the groove and a land adjacent to the groove, the groove has a first wobble part which is modulated by groove address information, a second wobble part which is modulated by address information of one adjacent land, and a third wobble part which is modulated by address information of the other adjacent land, a first section sandwiched between the second wobble parts of adjacent two grooves and a second section sandwiched between the third wobble parts of the adjacent two grooves are formed on the land, and one of phases of wobbles on both sides of the first section and phases of wobbles on both sides of the second section are substantially in-phase, the optical information recording medium reproducing device being configured to reproduce the address information of the land, when the land is scanned, from one of the first section and the second section in which the phases of the wobbles are substantially in-phase.

Effects of the Invention

According to the present disclosure, when the recording is performed for both the groove and the land, the address of the land can be recorded only by the modulation of the groove. One of two pieces of information reproduced when scanning the land is considered to be a valid land address. A signal for determining the validity is added, and the valid land address information can be obtained in addition to the result of an error correction code.

BRIEF DESCRIPTION OF DRAWINGS

FIG. 3 is a schematic diagram for explanation of a data structure of an ADIP word of the BD format.

FIGS. 5A and 5B are waveform diagrams for explanation of an STW.

FIGS. 6A and 6B are waveform diagrams for explanation of the STW.

FIG. 9 is a diagram schematically showing a pattern of a groove/land used for explanation of the second embodiment of the present disclosure.

MODE FOR CARRYING OUT THE INVENTION

The embodiments to be described below are preferred examples of the present disclosure, and various limitations technically preferable are added thereto. However, the scope of the present disclosure is not limited to these embodiments unless there is a description to limit the present disclosure particularly in the following explanation.

The following description is made in the following order.
<1. BD Format>
<2. First Embodiment>
<3. Second Embodiment>
<4. Modification>

1. BD Format

In the present disclosure, a format of address information, or the like complies with the BD (Blu-ray Disc (registered trademark) format. As a result of this, much of the technology practically used of BD, being a high density optical disk, can be used. Therefore, the address information in a BD format will be described prior to the description of the present disclosure.

Figure 1:
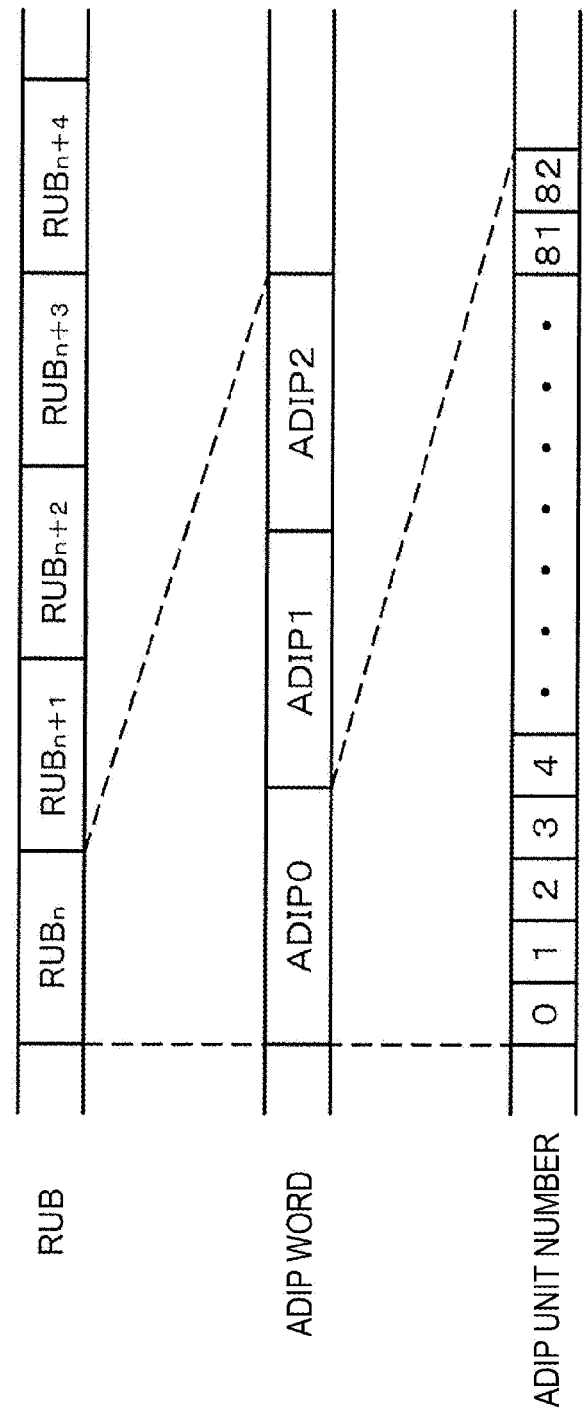
FIG. 1 is a schematic diagram for explanation of address data of a BD format.

As shown in FIG. 1, main data to be written is a sequence ($RUB_{n+0}$, $RUB_{n+1}$, $RUB_{n+2}$, $RUB_{n+3}$ . . . ) of a recording unit block (RUB). The RUB is a unit for recording main data (recording/reproducing data), and is set to be a predetermined length, for example, 64 k bytes. Three addresses in pregroove (ADIP) words, ADIP0, ADIP1 and ADIP2, are allotted to each RUB. ADIP0, ADIP1 and ADIP2 have identical address information.

In one ADIP word, 83 (unit numbers 0 to 82) ADIP units are included. In one ADIP word, the address information of 24-bit, auxiliary data of 12-bit, a reference region, an error correction code, and the like are stored. The above information is represented by using, for example, 60 ADIP units in 83 ADIP units.

Figure 2:
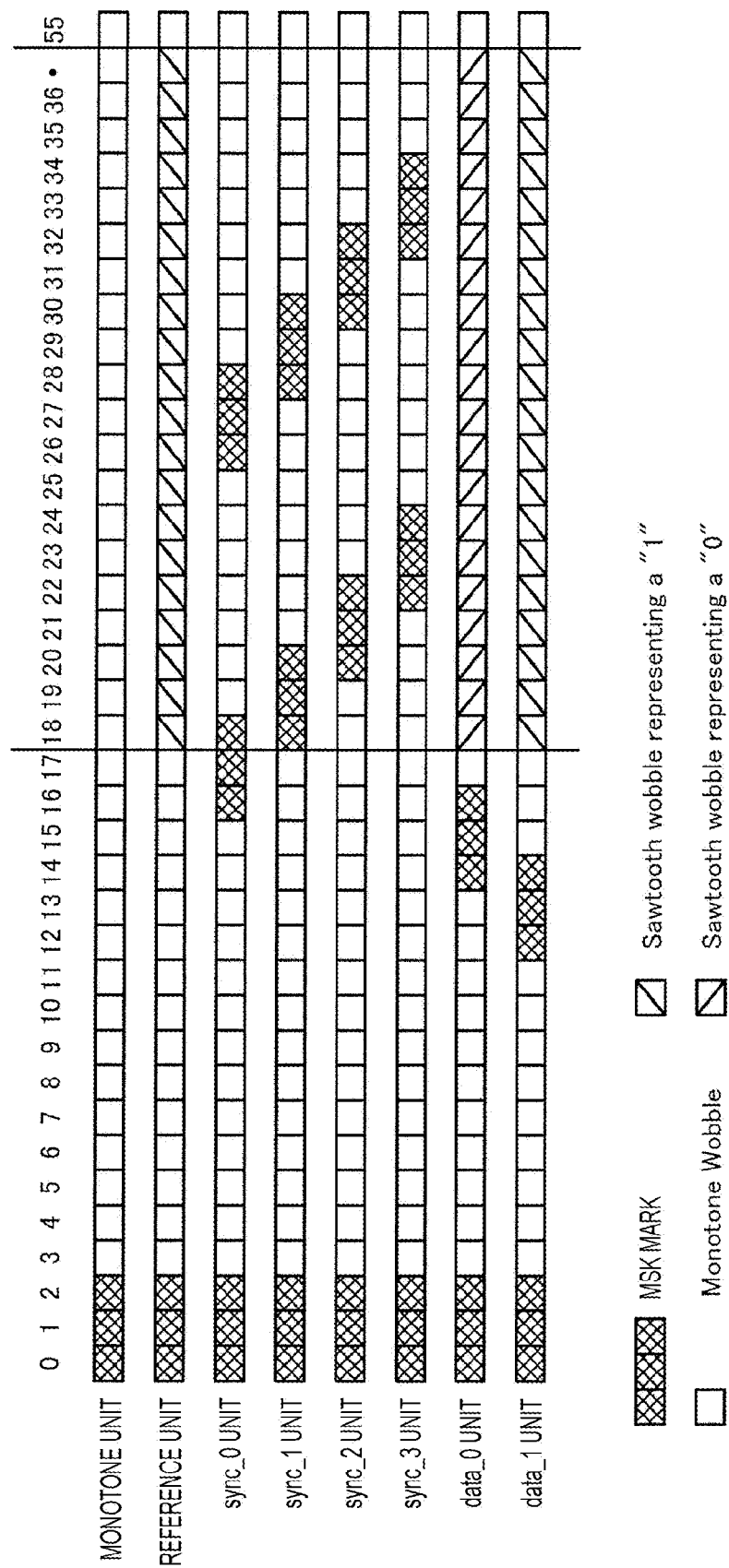
FIG. 2 is a schematic diagram for explanation of an ADIP unit of the BD format.

As shown in FIG. 2, a set of a total of 56 wobbles is considered to be the ADIP unit. One bit of "0" or "1", synchronization information, a reference unit, or a monotone unit is represented by this ADIP unit. One wobble is one cycle of, for example, a basic wobble waveform ($\cos(2\pi ft)$). Therefore, one ADIP word includes (83×56) wobbles. In FIG. 2, eight kinds (monotone unit, reference unit, four kinds of synchronization units, and two kinds of data units which respectively represent "0" and "1" of data) of ADIP units are shown. In FIG. 2, a set of 38 wobbles is shown due to the spatial restriction.

As shown in FIG. 2, the wobble numbers 0 to 55 are added to the ADIP unit including 56 wobbles and the 56 wobbles are distinguished. For example, the sections with wobble numbers 0 to 2 are modulated by minimum shift keying (MSK), and the sections with wobble numbers 18 to 55 of the reference unit and the data unit are modulated by a saw tooth wobble (STW). Monotone wobbles, which are not modulated, wobble at a basic wave of a predetermined frequency ($\cos(2\pi ft)$).

The ADIP word has a data structure as shown in FIG. 3. Types of ADIP units in FIG. 3 correspond to the kinds of the ADIP units in FIG. 2. Data of 60-bit is included in one ADIP word.

Figure 4:
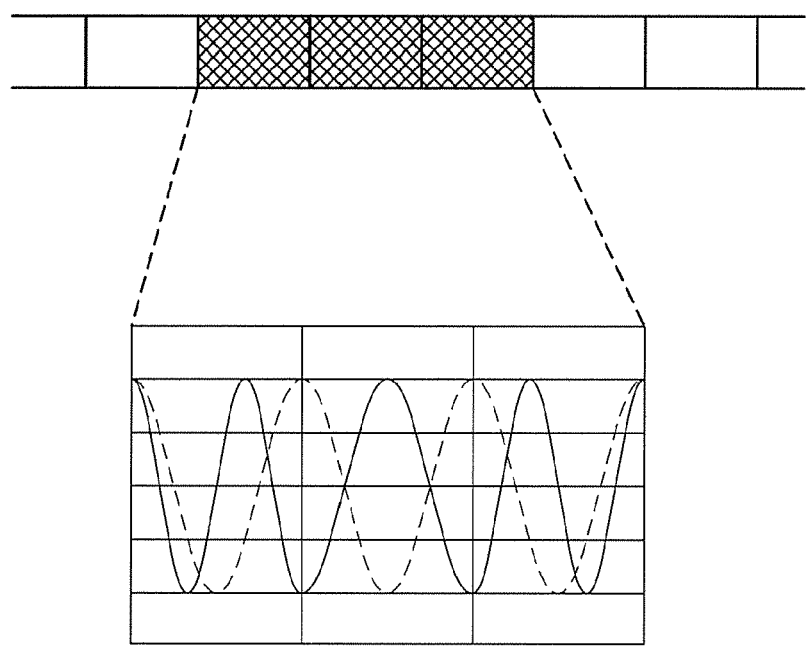
FIG. 4 is a waveform diagram for explanation of an MSK.

As shown in FIG. 4, three wobbles are included in the MSK. The polarity is inverted at the portion in which a waveform of the wobble at the center is not the MSK, since the frequency of the previous or next wobble is made 1.5 times the basic wave. The MSK is arranged at the head (0 to 2nd wobbles) of each ADIP unit and used for detecting a heading position of the ADIP unit.

In addition, as shown in FIG. 2, the MSK is arranged at the position of the 14th to 16th wobbles from the head of the ADIP unit of the data 0 and at the position of the 12th to 14th wobbles from the head of the ADIP unit of the data 1. In this manner, the data 0 and 1 are represented by the position of the MSK.

In the ADIP unit of the data 0, the MSK is set to be 0 and the STW representing 0 is arranged in the sections of the 18th to 55th wobbles from the head. In the ADIP unit of the data 1, the MSK is set to be 1 and the STW representing 1 is arranged in the sections of the 18th to 55th wobbles from the head.

An STW format generates a modulation waveform similar to saw-tooth by adding or subtracting a secondary harmonic wave ($\sin(2\pi 2ft)$) to/from the basic wave ($\cos(2\pi ft)$). An amplitude of the secondary harmonic wave is small which is about one-fourth of that of a basic waveform. One of adding and subtracting is selected by "0" or "1" of the data, and therefore the modulation waveforms differ. The wobble numbers of the reference unit and the data unit are repeatedly recorded in the 18th to 55th section.

The reason why two types of formats are used in this manner is for making it possible to make up for the disadvantage of each format. In an MSK format, 1-bit is recorded by modulating three wobbles at the head of the ADIP unit, and therefore can be used as a standard to decide the position of the data at the time of reproducing. On the other hand, in the STW format, a very small waveform change is repeatedly recorded over a wide range, and distinguishes "0" or "1" by integrating a reproducing signal at the time of reproducing. Therefore, it is difficult to use the reproducing signal as information to detect a separation of the data. However, the MSK format which is a local recording format is susceptible to a defect caused by a flaw, dust, or the like on a disk. The STW format has an advantage of being less susceptible to the defect because recording is performed for a longer period of time.

A modulation wobble signal of the STW format will be described in more detail with reference to FIGS. 5 and 6. In FIGS. 5 and 6, a horizontal axis represents a time axis, one cycle (that is, one wobble) of the basic wobble waveform is shown, and a vertical axis represents a normalized amplitude. FIG. 5A shows the waveform when data c(n) is "1" and FIG. 6A shows the waveform when data c(n) is "0".

In FIGS. 5A and 6A, the waveform shown in a broken line is the basic wobble waveform S0 ($=\cos(2\pi ft)$). In a case where c(n)="1", the modulated waveform S1 is formed by adding a sin signal having the double frequency of the basic wobble waveform S0. That is, $S1=A\cos(2\pi ft)+a\sin(2\pi 2ft)$ is satisfied. The relation is A>a, and for example, A=1 and a=0.2 are satisfied. This modulation wobble waveform S1 is the waveform which is modulated so that a rising (an outside direction of the disk in a radial direction of the disk) in a time direction is gentle compared with the basic wobble waveform S0, and so that a falling (an inside direction of the disk in the radial direction of the disk) in the time direction is steep compared with the basic wobble waveform S0.

As shown in FIG. 6A, in a case where c(n)="0", a modulated waveform S2 is formed by subtracting the sin signal having the double frequency of the basic wobble waveform S0. That is, $S2=A\cos(2\pi ft)-a\sin(2\pi 2ft)$ is satisfied. This modulation wobble waveform S2 is the waveform which is modulated so that the rising (the outside direction of the disk) in the time direction is steep compared with the basic wobble waveform S0, and so that the falling (the inside direction of the disk) in the time direction is gentle compared with the basic wobble waveform S0. In both the modulation wobble waveforms S1 and S2, a zero-cross point is the same phase as that of the basic wobble waveform, and the clock at the reproducing side can be easily extracted.

In FIGS. 5A and 6A, waveforms S3 and S4 each show a solution obtained by multiplying the sin signal ($\sin(2\pi 2ft)$), in which the frequency used in processing at the reproducing side is the double frequency of the basic wave, by a reproducing modulation wobble signal. That is, the waveform S3 is obtained by the reproducing modulation wobble waveform $S1\times\sin(2\pi 2ft)$, and the waveform S4 is obtained by the reproducing modulation wobble waveform $S2\times\sin(2\pi 2ft)$.

At the reproducing side, as shown in FIGS. 5B and 6B respectively, integrated values $\Sigma S3$ and $\Sigma S4$ can be obtained by integrating (accumulating) the waveforms S3 and S4 over one wobble cycle. The integrated value $\Sigma S3$ at the time when one wobble cycle has passed, is a positive value v1. On the other hand, the integrated value $\Sigma S4$ at the time when one wobble cycle has passed, is a negative value v0. The integrated value is treated, for example, as v1=+1, v0=−1.

Since 1-bit of the data is represented by 56 wobbles, +56 is obtained as the integration result of 56 wobbles when all wobbles are +1, and −56 is obtained as the integration result of 56 wobbles when all wobbles are −1. A reproduced chip sequence obtained as the integrated value of each wobble is multiplied by the same code sequence used in recording. Based on the result obtained and the integration result of 56 wobbles, 1-bit ("1"/"0") of the data is determined

2. First Embodiment

[Main Difference from BD Format]

In a first embodiment of the present disclosure, the main difference from the BD format described above is as described below.

In the BD format, a disk is rotated at a constant linear velocity (hereinafter refer to as CLV). On the other hand, in the present disclosure, the disk is rotated at a constant angular velocity (hereinafter referred to as CAV). A zone CAV can also be employed. The zone CAV divides the disk in a radial direction, forms a plurality of zones, and controls the CAV within the zone. In a spiral wobble track, phases of the basic wave of a wobble can be synchronized with each other in the radial direction of the disk by the CAV or the zone CAV.

In the BD format, a groove recording format which records in a groove is used. On the other hand, in the present disclosure, recording is performed on both the groove and a land in order to increase a recording capacity. As described above, a trench is referred to as the groove, and a track formed by the groove is referred to as a groove track. The groove is defined as a part which is irradiated with laser light when the optical disk is manufactured. An area sandwiched between the adjacent grooves is referred to as a land, and the track formed by the land is referred to as a land track.

A land track address is given to the land track. As the BD format, three address words are recorded in the groove track for every predetermined recording unit, for example, the RUB. One in three ADIP words is an address of the groove track, and the other two are the addresses of the land track. One of the two addresses of the land track is the address of the land track at the inner peripheral side in the radial direction of the disk. The other is the address of the land track at the outer peripheral side in the radial direction of the disk. Each address of the land track is recorded in the adjacent groove tracks on both sides. That is, each land address is recorded in the groove tracks adjacent on both sides.

[Arrangement (Recording) of Address Information]

Figure 7:
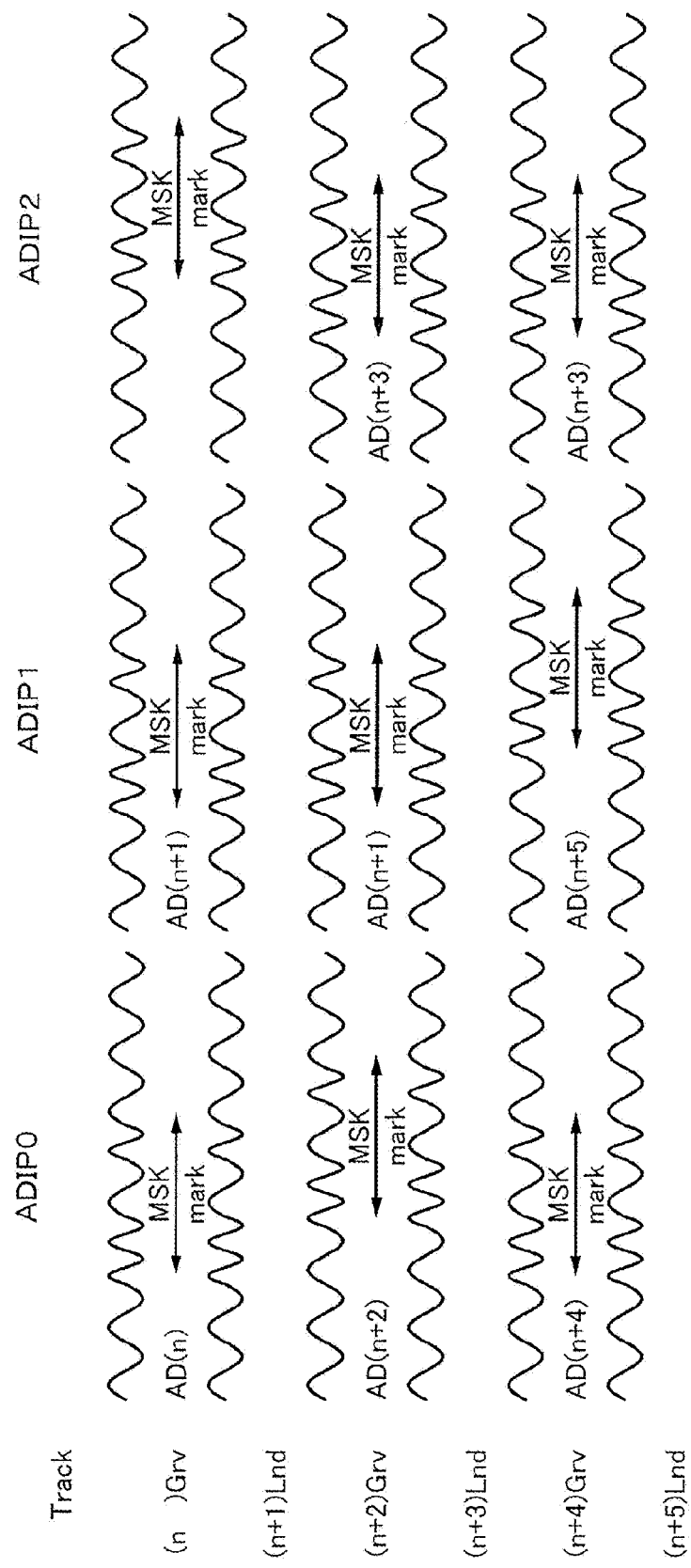
FIG. 7 is a diagram schematically showing a pattern of a groove/land used for explanation of a first embodiment of the present disclosure.

An arrangement of address information according to the first embodiment of the present disclosure will be described with reference to FIG. 7. FIG. 7 schematically shows the groove track (Grv) and the land track (Lnd) continuing in the radial direction of the disk. As an example, the upper side of the figure shows the inner side (center side) of the disk, and the lower side shows the outer peripheral side of the disk. The groove is formed spirally from the inner side toward the outer side of the disk so that the track address increases toward the outer side. In addition, a beam spot (recording/reproducing beam spot) is used for scanning from left to right in the figure.

In addition, in FIG. 7, a part of the three ADIP words (ADIP0, ADIP1, ADIP2) defined for every predetermined data unit, for example, the RUB is extracted and shown by focusing on the position of the MSK of the data unit included in the ADIP word so that the difference in addresses from the adjacent track is easily understood. These ADIP words are formed in different positions in a track direction. Each ADIP word includes 83 ADIP units, and each ADIP unit includes 56 wobbles as with those of the BD format. Then, each ADIP word includes address information, an error correction code, and the like. Each ADIP word includes (56×83) wobbles. The wobble track in FIG. 7 shows only a part of the wobbles, for example, only a head part of each ADIP unit. In FIG. 7, as an example, the groove track has an even-numbered track number, and the land track has an odd-numbered track number.

In FIG. 7, the groove tracks Trkn, Trk(n+2), Trk(n+4), . . . (n=0, 1, 2, . . . ) are shown. The tracks Trk(n+1), Trk(n+3) . . . sandwiched between the groove tracks on both sides are the land tracks. The address information (hereinafter suitably referred to as a groove address) n, n+2, n+4, . . . of the groove track is recorded as the first word ADIP0 of each groove track. The address information (hereinafter suitably referred to as the land address) n+1, n+5, . . . of the land track is recorded as the next word ADIP1. The land address n+3, n+7, . . . is recorded as the third word ADIP2. The groove address and the land address are recorded, for example, in the MSK format.

The land address is doubly recorded in each groove in this manner. For example, the land address recorded as one address word ADIP1 of the groove track Trkn is the address of the land track Trk(n+1) adjacent to the outer side. The land address recorded as the other address word ADIP2 of the groove track Trkn is the address of the land track adjacent to the inner side.

In addition, the land address recorded as one address word ADIP1 of the groove track Trk(n+2) is the address of the land track Trk(n+1) adjacent to the inner side. The land address recorded as the other address word ADIP2 of the groove track Trk(n+2) is the address of the land track Trk(n+3) adjacent to the outer side.

That is, in the ADIP1 section in the ADIP word, the land address of the land track Trk(n+1) is recorded in the adjacent groove track Trkn and groove track Trk(n+2) on both sides. Since the same address data has been recorded, the wobble phases on both sides of a recording area become substantially the same. Therefore, when the land track Trk(n+1) is scanned with the beam spot, the land address of the land track can be reproduced using a push-pull format.

In addition, in the ADIP2 section in the ADIP word, the land address of the land track Trk(n+3) is recorded in the adjacent groove track Trkn(n+2) and groove track Trk(n+4) on both sides. Since the same address data has been recorded, the wobble phases on both sides of the recording area, including the position of an MSK mark, become substantially the same. Therefore, when the land track Trk(n+3) is scanned with the beam spot, the land address of the land track can be reproduced using the push-pull format.

As described above, in addition to its own groove address, the adjacent two land addresses on both sides are recorded in each groove track. Therefore, when the land track is scanned, in the part of the land track sandwiched between the sections of the groove tracks which record the same address, the phase of the wobble changes in the same way, and the land address can be acquired from the wobble.

In the first embodiment of the present disclosure, the groove address and the land address can be recorded in a similar format to the BD format which records the ADIP word triply in an RUB unit. For example, these addresses can be recorded as the wobble track which is modulated in the MSK format. In addition, since the land address can also be recorded only by the wobble of the groove track, it is possible to record the address without significantly changing a mastering device of the existing BD format.

3. Second Embodiment

[Configuration of ADIP Unit]

In the first embodiment described above, when a land track, for example the land track Trk(n+1) is scanned with a beam spot, an address of the land track can be acquired in the ADIP1 section. Then, the next ADIP2 section is identified as error data by error correction since the different address information is also reproduced. When the next land track Trk(n+3) is scanned with the beam spot, the address of the land track can be acquired in the ADIP2 section. Then, the previous ADIP1 section is identified as error data.

However, due to the reason such as detrack, the error correction is performed on the address of one adjacent groove track in an invalid address part, and the address may be treated as a valid address. In this case, two addresses are considered to be valid, and therefore, it is not possible to determine which address is valid. In a second embodiment of the present disclosure, such a problem is solved.

In the second embodiment, a groove address and a land address are recorded by an MSK, and the validity of the land address is determined by using an STW which has been introduced into a BD format. As a result, the above-described problem is solved.

Figure 8:
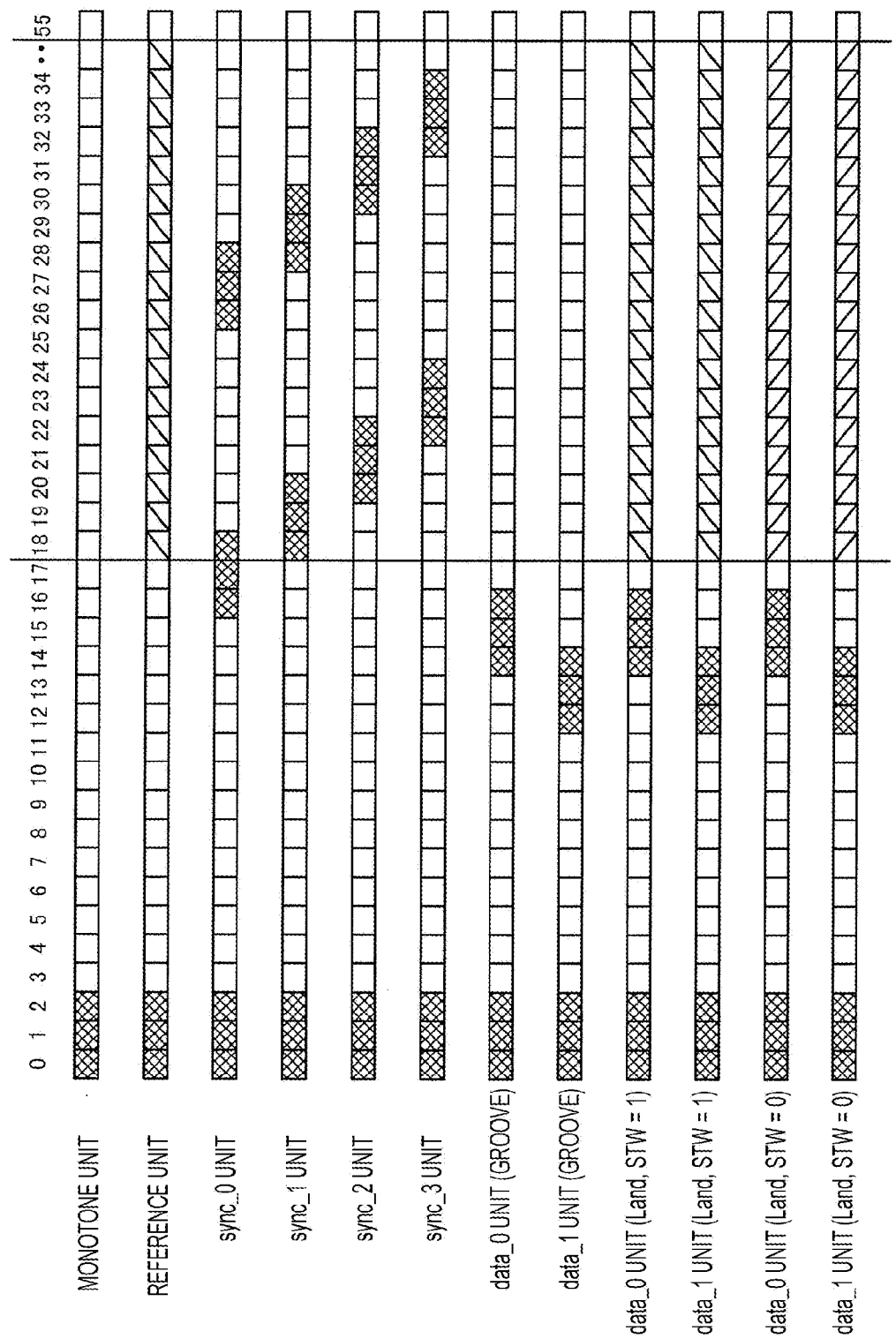
FIG. 8 is a schematic diagram showing kinds of ADIP units used for explanation of a second embodiment of the present disclosure.

As shown in FIG. 2, there are eight kinds as ADIP units in the BD format. As shown in FIG. 8, twelve kinds of ADIP units are defined in the second embodiment of the present disclosure. As can be seen by comparing FIGS. 2 and 8, a monotone unit, a reference unit, and sync units 0 to 3 are the same as those of the BD format. As to an MSK part of the groove address, a data unit is similar to that of the BD format. A non-modulation basic waveform (monotone) is arranged in place of the STW in an STW part in the data unit of the groove address.

The MSK which represents the land address is similar to that of a groove and the BD format. Two kinds of ADIP units, having the different STW arranged in the wobble numbers 18 to 55, are defined even in a data 0 unit. Similarly, two kinds of ADIP units, having the different STW arranged in the wobble numbers 18 to 55, are defined even in a data 1 unit. The ADIP word has a similar data structure to that of the BD format.

That is, in one ADIP word, 83 (unit numbers 0 to 82) ADIP units are included. Data such as the address information is represented by using, for example, 60 ADIP units in 83 ADIP units in one ADIP word. Therefore, STW data of 60 ADIP units can be possessed. All of these STWs are used to determine the validity of the land address.

As an example, when the remainder, obtained by dividing the track number of the land track represented by the address by 8, is 1 or 3, the STW is considered to be 1, and when the remainder is 5 or 7, the STW is considered to be 0. In the groove address, the STW is not added and the monotone is added. As a result of this, the STW values of the land address recorded in the adjacent two grooves are the same in a valid land address. On the other hand, the STW values of the land address recorded in the adjacent two grooves are different in an invalid land address. As a result, the amplitude of the STW while scanning the land track becomes small.

FIG. 9 shows a more concrete example of the groove address and the land address. In the groove address, the monotone is added after the data part. In the land address, the STW is added after the data, and the STW representing the same data is added to a pair (surrounded and shown by the broken line in FIG. 9) of land addresses included in the valid land address.

At the time of reproducing, the validity of the address is determined in the ADIP word by using the integration results of the reference units (15 units) and the integration results of the STWs (60 STWs). In an STW amplitude, the longer the integration section, the higher the reliability. In the second embodiment of the present disclosure, all of the integration results of the reference units and the integration results of the data units in the ADIP word can be used in determining whether the land address is valid. As a result, even with a defect and the like, determination is performed without problems.

[Disk Reproducing Device]

Figure 10:
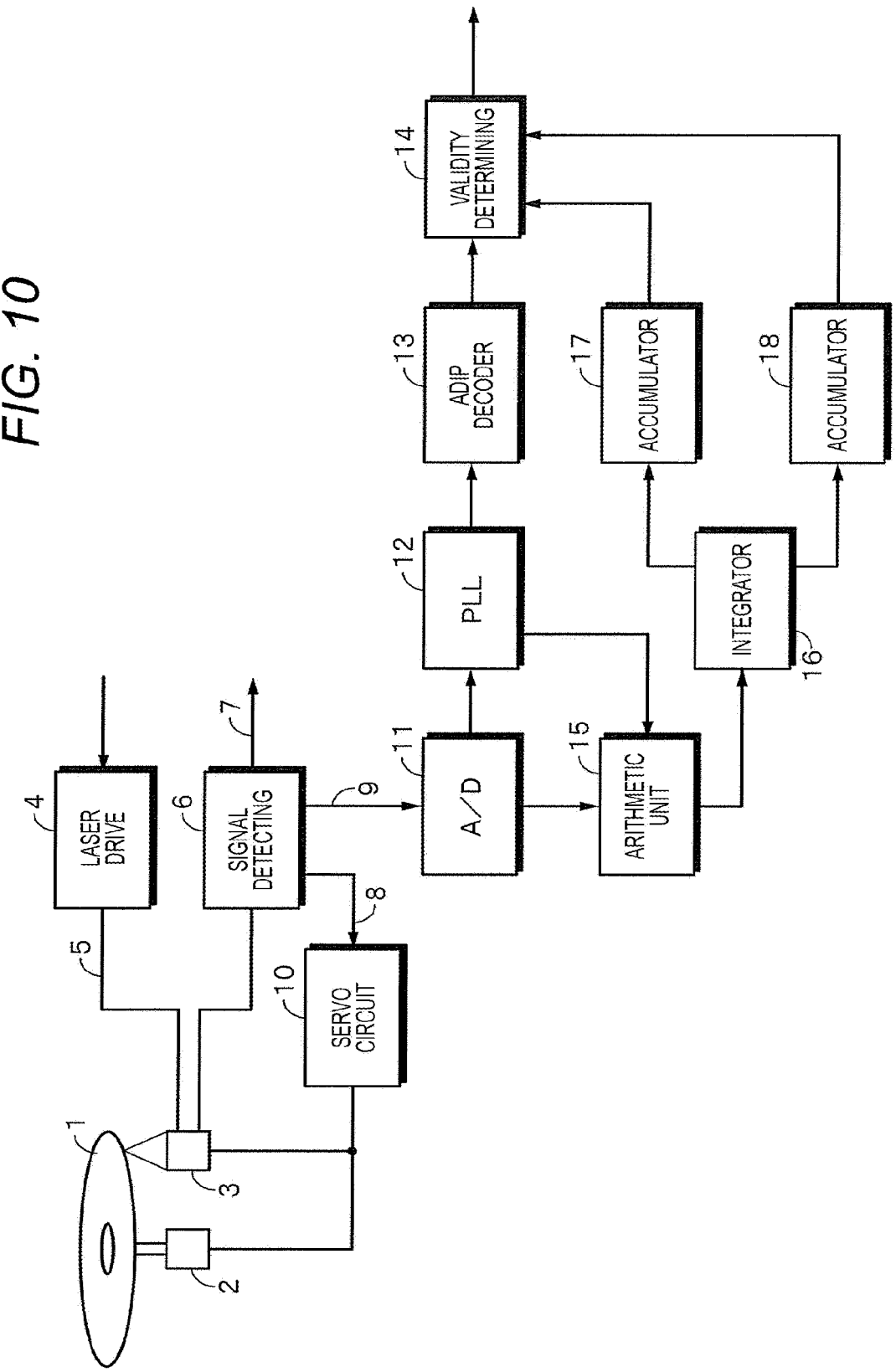
FIG. 10 is a block diagram showing a reproducing device according to the second embodiment of the present disclosure.

With a disk reproducing device according to the second embodiment of the present disclosure, reproduction of the address is mainly described. As shown in FIG. 10, the data is recorded on an optical disk 1 in which the groove address and the land address are recorded, and the data is reproduced from the optical disk 1.

The optical disk 1 is rotated by a spindle motor 2 at a constant angular velocity. That is, the optical disk 1 is rotated by a CAV format. A zone CAV format may also be used. A drive signal from a laser drive part 4 is supplied to an optical head 3. A laser beam, the intensity of which is modulated based on recorded data 5, is emitted to the optical disk 1 from the optical head 3. Then the data is recorded in a predetermined position, which is determined based on the address information reproduced, of the optical disk 1.

A reading laser beam is emitted to the optical disk 1 from the optical head 3. The reflected light is detected by a photo-detector in the optical head 3 and a reproducing signal is detected by a signal detecting part 6. A reproducing signal 7, a servo error signal 8 such as a focus error signal and a tracking error signal, and a wobble signal 9 are extracted from the signal detecting part 6. The wobble signal 9 is an output signal of a detector in which a photo-detection element is divided into two in a track direction. For example, a signal of the sum of two detectors is extracted as the wobble signal 9. The wobble signal 9 corresponds to a wobble waveform. When the phases of the wobbles on both sides of the track are the same, the level of the wobble signal 9 becomes maximum. On the other hand, when the phases of the wobbles on both sides are opposite, the level of the wobble signal 9 becomes minimum.

The error signal 8 is supplied to a servo circuit 10. By the servo circuit 10, the rotation of the spindle motor 2 is controlled at the constant angular velocity and the focus and the tracking of the optical head 3 are controlled.

The wobble signal 9 detected by the signal detecting part 6 is supplied to an A/D converter 11. Then the wobble signal 9 is converted to a digital signal by the A/D converter 11. The output signal of the A/D converter 11 is supplied to a digital phase locked loop (PLL) 12 and an arithmetic unit 15. The clock synchronizing with the reproducing signal is output from the PLL 12. The clock is made to be a basis of timing of the processing at the time of reproducing. The clock is supplied to the arithmetic unit 15 from the PLL 12.

A digital output of the wobble signal 9 is supplied to an ADIP decoder 13. The ADIP decoder 13 decodes address data and the like recorded as the MSK for every ADIP word, and performs error correction. The address data decoded by the ADIP decoder 13 is supplied to a validity determining part 14. Groove address information is extracted as output when the groove track has been scanned. When the land addresses has been scanned, the two land addresses are temporarily retained, and the only land address determined as valid by the validity determining part 14 is output.

In the arithmetic unit 15, as described above, a sin signal $(\sin(2\pi 2ft))$ in which the frequency is twice the frequency of the basic wave is multiplied by the wobble signal (STW) reproduced. That is, $S3=S1\times\sin(2\pi 2ft)$ or $S4=S2\times\sin(2\pi 2ft)$ can be obtained. The output signal of the arithmetic unit 15 is supplied to an integrator 16. Then, the integration within one wobble cycle is performed in the integrator 16. The integration result within one wobble cycle is +1 or −1.

In the second embodiment of the present disclosure, the STWs are included in the reference unit and the data unit of the land address. In one ADIP, STWs of 15 reference units and 60 data units are included. The integration result of the reference unit by the integrator 16 is supplied to an accumulator 17. Then, the integration result corresponding to the 15 reference units is accumulated in the accumulator 17. Similarly, the integration result of the STW of the data unit by the integrator 16 is supplied to an accumulator 18. Then the integration result corresponding to the 60 reference units is accumulated in the accumulator 18.

The integration result of one ADIP word section of the reference unit by the accumulator 17 and the integration result of the ADIP word section of the data unit are supplied to the validity determining part 14. The validity determining part 14 determines whether the land address is valid using these integration results.

[First Method of Determining Validity of Land Address]

Figure 11:
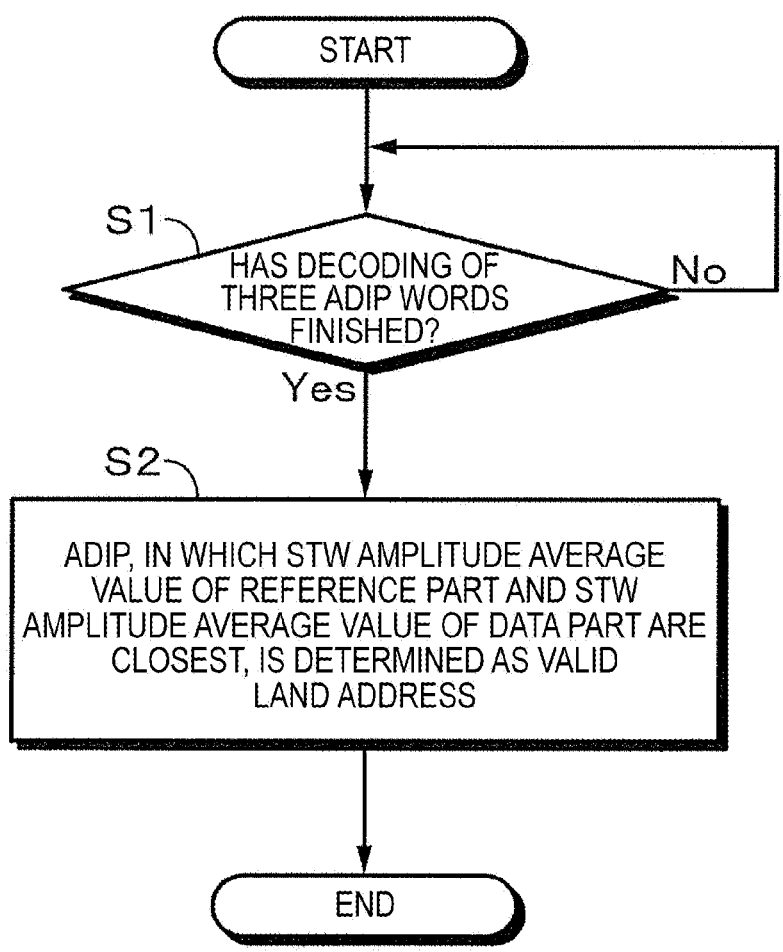
FIG. 11 is a flowchart for explanation of a first example of validity determining processing for an address according to the second embodiment of the present disclosure.

A first method of determining validity of the land address will be described with reference to FIG. 11. In Step S1, it is determined whether the decoding of three ADIP words has finished when the land track is scanned.

When it is determined in Step S1 that the decoding of three ADIP words has finished, the validity is determined in Step S2. The reference STW average value is calculated by dividing an integrated value of the STW amplitude in a reference part by 15. A data STW average value is calculated by dividing an integrated value of the STW amplitude in a data part by 60. Absolute values are taken of the reference STW average value and the data STW average value and compared. The absolute values are compared since there is a case where the STW amplitude in the data part is (−1).

As can be seen from FIG. 9, the three ADIP words reproduced in a case where the land address is scanned are as described below.

Groove address: The reference STW average value is substantially 1, and the data STW average value is substantially 0 since the monotone is added. Actually these values do not often become exactly 0 or 1 affected by noise, etc. Therefore "substantially" is added.

Valid land address: The reference STW average value is substantially 1, and the data STW average value is substantially 1 since the STWs are in-phase.

Invalid land address: The reference STW average value is substantially 1, and the data STW average value is substantially 0 or a small value since the STWs are reversed-phase.

Therefore, in Step S2, the reference STW average value and the data STW average value are compared. Then the address having the data STW average value, which is the closest to the reference STW average value, is determined as the valid land address.

[Second Method of Determining Validity of Land Address]

Figure 12:
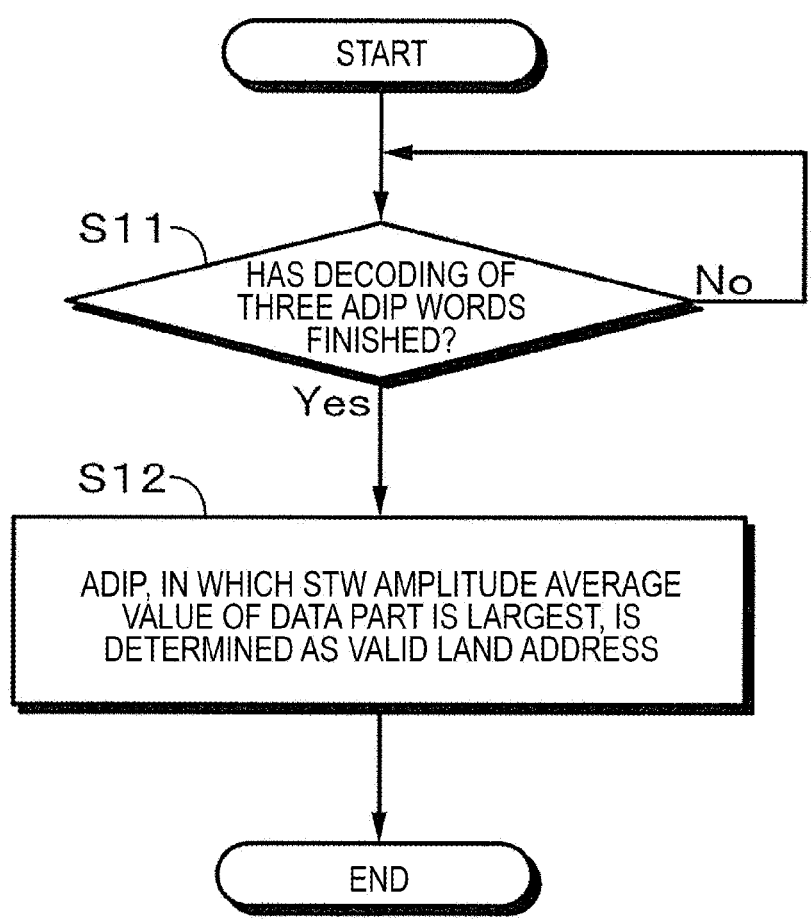
FIG. 12 is a flowchart for explanation of a second example of the validity determining processing for the address according to the second embodiment of the present disclosure.

A second method of determining validity of the land address will be described with reference to FIG. 12. In Step S11, it is determined whether the decoding of three ADIP words has finished when the land track is scanned.

When it is determined in Step S11 that the decoding of three ADIP words has finished, the validity is determined in Step S12. In Step S12, the land address in which the data STW average value is the largest, is determined as the valid land address. As described above, in the groove address and the invalid land address, the data STW average value is small.

[Third Method of Determining Validity of Land Address]

Figure 13:
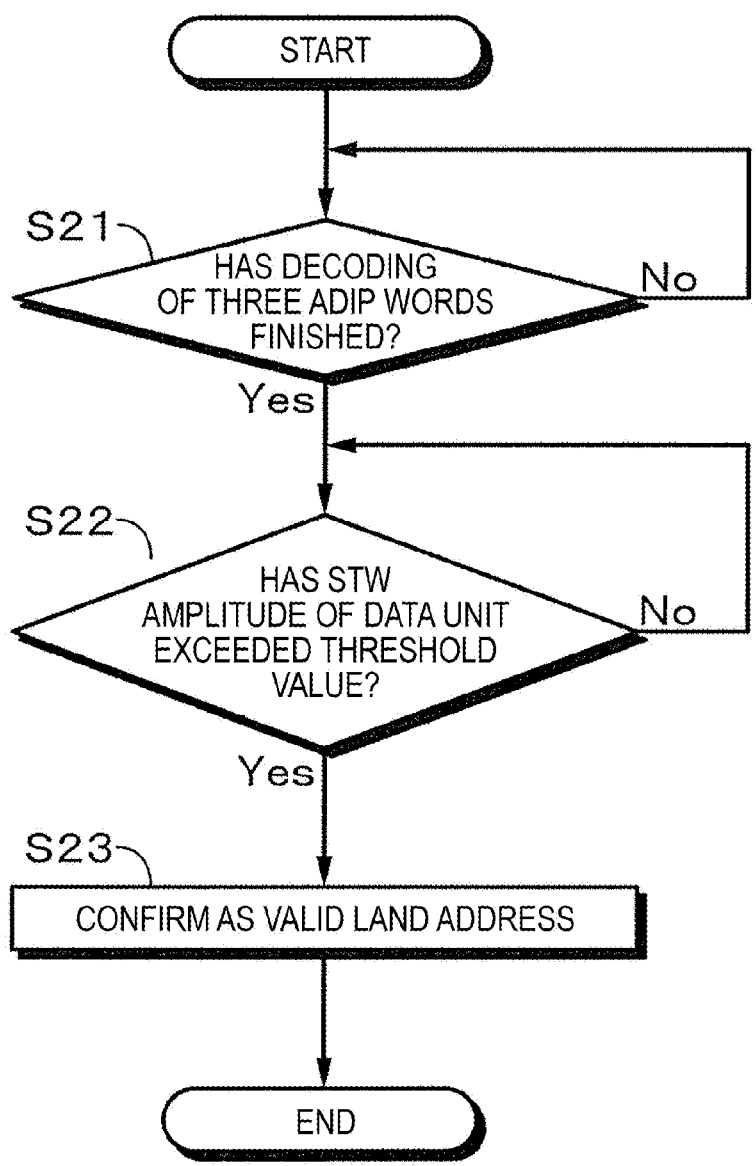
FIG. 13 is a flowchart for explanation of a third example of the validity determining processing for the address according to the second embodiment of the present disclosure.

A third method of determining validity of the land address will be described with reference to FIG. 13. In Step S21, it is determined whether the decoding of three ADIP words has finished when the land track is scanned.

When it is determined in Step S21 that the decoding of three ADIP words has finished, the data STW average value and a threshold value are compared in Step S22. That is, it is determined whether the data STW average value exceeds the threshold value. When the data STW average value exceeds the threshold value, the land address is confirmed as valid in Step S23. The threshold value is set to an appropriate value to determine the validity of the address. For example, the threshold value may be generated using the reference STW average value.

In the above-described validity determining method for the land address, the valid land address can be reproduced by determining whether the data part of the land track is sandwiched by the in-phase STWs or sandwiched by the reversed-phase STWs. That is, it is possible to determine the correct land address without depending on the result of error correction.

4. Modification

Although the embodiments of the present disclosure have been described specifically as above, the present disclosure is not limited to each embodiment described above, and can be modified in various ways based on the technical concept of the present disclosure. For example, the configurations, methods, steps, shapes, materials, and numerical values given in the embodiments described above are merely examples, and if necessary, different configurations, methods, steps, shapes, materials, and numerical values may be used.

In the present disclosure, it is possible to employ the following configurations.

(1)

An optical information recording medium of a CAV or a zone CAV, wherein a groove which continuously wobbles is preliminary formed and information is recorded in the groove and a land adjacent to the groove, the groove has a first wobble part which is modulated by groove address information, a second wobble part which is modulated by address information of one adjacent land, and a third wobble part which is modulated by address information of the other adjacent land, a first section sandwiched between the second wobble parts of adjacent two grooves and a second section sandwiched between the third wobble parts of the adjacent two grooves are formed on the land, and one of phases of wobbles on both sides of the first section and phases of wobbles on both sides of the second section are substantially in-phase.

(2)

The optical information recording medium described in (1), wherein the first wobble part, the second wobble part, and the third wobble part are formed on different positions in a track direction.

(3)

An optical information recording medium reproducing device configured to optically reproduce an optical information recording medium of a CAV or a zone CAV, wherein a groove which continuously wobbles is preliminary formed and information is recorded in the groove and a land adjacent to the groove, the groove has a first wobble part which is modulated by groove address information, a second wobble part which is modulated by address information of one adjacent land, and a third wobble part which is modulated by address information of the other adjacent land, a first section sandwiched between the second wobble parts of adjacent two grooves and a second section sandwiched between the third wobble parts of the adjacent two grooves are formed on the land, and one of phases of wobbles on both sides of the first section and phases of wobbles on both sides of the second section are substantially in-phase, the optical information recording medium reproducing device being configured to reproduce the address information of the land, when the land is scanned, from one of the first section and the second section in which the phases of the wobbles are substantially in-phase.

(4)

The optical information recording medium reproducing device described in (3), wherein a determination signal for determining one of the address information reproduced in the first section and the address information reproduced in the second section as valid, is added to each of the second wobble part and the third wobble part.

(5)

The optical information recording medium reproducing device described in (3) or (4), wherein the determination signal is a waveform signal in which a harmonic signal having different polarities depending on data is added to a basic waveform.

(6)

The optical information recording medium reproducing device described in any one of (3), (4), and (5),
wherein the optical information recording medium reproducing device has a detector that is divided into at least two in a track direction of the optical information recording medium, and detects return light from the optical information recording medium, and
the optical information recording medium reproducing device reproduces the first wobble part and the second wobble part by output of a light receiving part on both sides in the track direction of the detector.

(7)

The optical information recording medium reproducing device described in any one of (3), (4), (5), and (6), wherein the basic waveform is modulated in an MSK format by the address information.

REFERENCE SIGNS LIST

1 OPTICAL DISK
2 SPINDLE MOTOR
3 OPTICAL HEAD
12 PLL
13 ADIP DECODER
14 VALIDITY DETERMINING PART
16 INTEGRATOR

The invention claimed is:

1. An optical information recording medium of a constant angular velocity (CAV) or a zone CAV, comprising:
   a groove which continuously wobbles and is preliminarily formed, and a land which is formed adjacent to the groove, wherein information is recorded in the groove and the land,
   wherein the groove has a first wobble part which is modulated by groove address information of the groove, a second wobble part which is modulated by address information of the land adjacent to the groove and a third wobble part which is modulated by address information of another land adjacent to the groove,
   a first section sandwiched between the second wobble parts of two adjacent grooves and a second section sandwiched between the third wobble parts of the two adjacent grooves are formed on the land, and
   one of phases of wobbles on both sides of the first section and phases of wobbles on both sides of the second section are substantially in-phase.

2. The optical information recording medium according to claim 1, wherein the first wobble part, the second wobble part, and the third wobble part are formed on different positions in a track direction.

3. An optical information reproducing device configured to optically reproduce an optical information on recording medium of a constant angular velocity (CAV) or a zone CAV comprising:
   a groove which continuously wobbles and is preliminarily formed, and a land adjacent to the groove, wherein information is recorded in the groove and the land,
   wherein the groove has a first wobble part which is modulated by groove address information of the groove, a second wobble part which is modulated by address information of the land adjacent to the groove and a third wobble part which is modulated by address information of another land adjacent to the groove,
   a first section sandwiched between the second wobble parts of two adjacent grooves and a second section sandwiched between the third wobble parts of the two adjacent grooves are formed on the land,
   one of phases of wobbles on both sides of the first section and phases of wobbles on both sides of the second section are substantially in-phase, and
   the optical information reproducing device is configured to reproduce the address information of the land, when the land is scanned, from one of the first section and the second section in which the phases of the wobbles are substantially in-phase.

4. The optical information reproducing device according to claim 3,
   wherein a determination signal for determining one of the address information reproduced in the first section and the address information reproduced in the second section as valid, is added to each of the second wobble part and the third wobble part.

5. The optical information reproducing device according to claim 4,
   wherein the determination signal is a waveform signal in which a harmonic signal having different polarities depending on data is added to a basic waveform.

6. The optical information reproducing device according to claim 3,
   wherein the optical information reproducing device has a detector that is divided into at least two in a track direction of the recording medium, and detects return light from the recording medium, and
   wherein the optical information reproducing device reproduces the first wobble part and the second wobble part by output of a light receiving part on both sides in the track direction of the detector.

7. The optical information reproducing device according to claim 3, wherein a basic waveform is modulated in a minimum shift keying (MSK) format by the address information.

* * * * *